(12) United States Patent
Kessler et al.

(10) Patent No.: US 7,731,399 B2
(45) Date of Patent: Jun. 8, 2010

(54) ILLUMINATION IN THE AREA OF AIRCRAFT CABINS

(75) Inventors: Jens Kessler, Buxtehude (DE); Carsten Kohlmeier-Beckmann, Buxtehude (DE); Hubertus Pohlmann, Hamburg (DE)

(73) Assignee: Airbus Deutschland GmbH (DE)

( * ) Notice: Subject to any disclaimer, the term of this patent is extended or adjusted under 35 U.S.C. 154(b) by 161 days.

(21) Appl. No.: 12/064,412

(22) PCT Filed: Aug. 21, 2006

(86) PCT No.: PCT/EP2006/008215

§ 371 (c)(1),
(2), (4) Date: Feb. 28, 2008

(87) PCT Pub. No.: WO2007/077943

PCT Pub. Date: Mar. 1, 2007

(65) Prior Publication Data

US 2008/0219012 A1    Sep. 11, 2008

Related U.S. Application Data

(60) Provisional application No. 60/710,072, filed on Aug. 22, 2005.

(30) Foreign Application Priority Data

Aug. 22, 2005 (DE) .................. 10 2005 039 651

(51) Int. Cl.
*F21V 21/005* (2006.01)
(52) U.S. Cl. ..................... 362/471; 362/484
(58) Field of Classification Search ............ 362/471, 362/477, 484
See application file for complete search history.

(56) References Cited

U.S. PATENT DOCUMENTS

| 2,082,124 | A | * | 6/1937 | Schepmoes | 362/484 |
| 2,887,802 | A | * | 5/1959 | Burmeister | 362/484 |
| 5,347,434 | A | * | 9/1994 | Drake | 362/484 |
| 5,535,230 | A | | 7/1996 | Abe | 372/43 |
| 5,647,658 | A | * | 7/1997 | Ziadi | 362/471 |
| 6,074,074 | A | | 6/2000 | Marcus | |

(Continued)

FOREIGN PATENT DOCUMENTS

CN        1065673 C        5/2001

(Continued)

OTHER PUBLICATIONS

International Search Report and Written Opinion in English dated Jan. 12, 2007, issued in corresponding PCT Application No. PCT/EP06/008215.

*Primary Examiner*—David V Bruce
(74) *Attorney, Agent, or Firm*—Ostrolenk Faber LLP

(57) ABSTRACT

The present invention relates to an illumination strip for illuminating a handrail recess that itself at the same time forms a handrail; to a hatrack for installation in an aircraft cabin with a correspondingly designed handrail recess that at least in sections can be illuminated; as well as to the use of an illumination strip or a hatrack in an aircraft. The illumination strip comprises a carrier module for accommodating the illumination unit and illumination units accommodated by the carrier module. The carrier module is strip shaped and includes a positive locking member to secure the carrier module of the illumination strip into the handrail in an exchangeable manner.

18 Claims, 5 Drawing Sheets

U.S. PATENT DOCUMENTS

| | | |
|---|---|---|
| 2003/0031021 A1 * | 2/2003 | Kuisma ............... 362/484 |
| 2005/0104740 A1 | 5/2005 | Stokes |

FOREIGN PATENT DOCUMENTS

| | | | |
|---|---|---|---|
| DE | 692 15 076 | T2 | 6/1997 |
| DE | 196 27 856 | A1 | 1/1998 |
| DE | 200 16 406 | U1 | 2/2002 |
| EP | 0 570 441 | B1 | 11/1996 |
| EP | 1 348 904 | | 10/2003 |
| EP | 1 348 904 | A | 10/2003 |
| EP | 1 493 662 | | 1/2005 |
| EP | 1 493 662 | A | 1/2005 |

* cited by examiner

ILLUMINATION IN THE AREA OF AIRCRAFT CABINS

CROSS REFERENCE TO RELATED APPLICATION

The present application is a 35 U.S.C. §§371 national phase conversion of PCT/EP2006/008215, filed Aug. 21, 2006, which claims priority of German Patent Application No. 10 2005 039 651.8, filed Aug. 22, 2005, and U.S. Provisional Application No. 60/710,072, filed Aug. 22, 2005, the disclosures of which have been incorporated herein by reference. The PCT International Application was published in the English language.

FIELD OF THE INVENTION

The present invention relates to the technical field of illumination technology in the area of interior furnishings of aircraft. In particular, the invention relates to an illumination strip by means of which a handrail recess, which in turn at the same time forms a handrail, can be illuminated. Furthermore, the invention relates to a hatrack for installation in an aircraft cabin with a correspondingly designed handrail recess which, at least in sections, may be illuminated. Finally, the invention relates to the use of an illumination strip, or a hatrack in an aircraft.

TECHNOLOGICAL BACKGROUND TO THE INVENTION

Passengers travelling in an ordinary large-capacity aircraft may find that it is often difficult to locate and read the seat designators that mark their allocated seat. As a rule this is because such seat designators are often located on the underside of the overhead baggage storage spaces or baggage lockers, which baggage lockers in the context of the present invention are referred to as "hatracks". From the point of view of a person of normal stature the underside of these hatracks is normally approximately at shoulder height so that it may almost be impossible to identify these seat designators while standing. Apart from this, the above-mentioned seat designators are often simple signs displaying the respective seat numbers. However, in the often unfavourable lighting conditions in the passenger cabin, these simple signs are frequently difficult to read, which may result in further problems.

U.S. Pat. No. 5,347,434 describes a proposal for an improved version, according to which the signs are affixed at the front region of a hatrack, in a recess that accommodates a handrail. This arrangement may make it possible for a standing passenger to see the seat designator almost at eye level, wherein it is further proposed that the seat designator be illuminated by a lamp that is accommodated in the handrail so that the designator can be read more easily.

However, the handrail, due to having been fitted in the recess in the hatrack, may extend only for a distance of a few seat rows, so that a passenger who is guided along by the handrail has to repeatedly let go of the handrail and then grip the following handrail again. Apart from this, when the lamps are on for an extended period of time they may heat the handrail to such an extent that due to the heat generated passengers are unable to hold the handrail for any length of time.

SUMMARY OF THE INVENTION

According to an exemplary embodiment of the present invention, an illumination strip for illuminating a handrail recess that forms a handrail, a specially designed hat rack as well as the use of an illumination strip or a hatrack in an aircraft is provided.

The illumination strip according to an exemplary embodiment of the present invention is suitable for illuminating a handrail recess in a hatrack, which recess in turn forms a handrail. As already mentioned, in the context of the present invention the term "hatrack" refers to an overhead baggage stowage space or baggage locker which may, for example, comprise covers for opening and closing off the hatrack. In this arrangement the handrail recess may for example be an offset shape along the hatrack, wherein said handrail recess is in the shape of a concave C whose lower part can serve as a handrail. To this extent the handrail forms part of the hatrack so that the two together form a single-piece body. The illumination strip according to an exemplary embodiment of the present invention comprises a carrier module that is designed to accommodate an illumination means. Furthermore, the illumination strip comprises a multitude of illumination means that are accommodated by the carrier strip. So that the carrier module may properly illuminate the handrail recess, and in particular seat designators arranged thereon, the carrier module is designed to exchangeably fit, along the handrail recess, into the handrail. To this effect the carrier module, like the illumination strip itself, is strip shaped and comprises at least one positive-locking means with which the carrier module can be fitted into the handrail so that a positive fit is established. In this document the term "positive-locking means" refers to any shape that is suitable to engage in a positive-locking manner, a corresponding counter-contour in the handrail, as may be known to the average person skilled in the art.

As shown above, an implementation is thus provided which may make it possible to backlight a handrail so that with it the seat designators arranged in the handrail recess can be brightly illuminated. Furthermore, thanks to the one-piece design of the handrail and hatrack a shape is provided that may make it possible for passengers to continuously be guided along the handrail without having to let go of the handrail at abutting joints as they are known from the state of the art. Such a continuous handrail design may be particularly suitable especially in emergency situations, because, for example, with poor visibility as a result of smoke build-up, passengers heading for the emergency exits are not at risk of failing to find an exit path again, which exit path has been predefined by the handrail, after having had to let go of the handrail.

Since air passengers that are guided along by a handrail do not wish to be exposed to the danger of burning their hands as a result of heat generated by the illumination means in the handrail, only illumination means that are associated with particularly little heat generation may be used. It has been shown that light emitting diodes (LEDs) may be used as illumination means, because, as a rule, they may generate only little heat.

Since both the illumination strip according to an exemplary embodiment of the present invention and the carrier module may be designed so as to be strip shaped it is expedient if the multitude of illumination means that are accommodated by the carrier strip are also designed in the form of light emitting diode strips. In this way a multitude of light emitting diodes may be arranged closely together on a flexible rollable carrier material so as to be installed as piece goods in the carrier module.

A positive effect may be generated by means of the illumination strip according to the invention in that the individual illumination means of the multitude of illumination means are RGB light emitting diodes. In this way it is possible to illuminate the handrail recess in different colours, which may, for example, be desirable in order to differentiate between different passenger classes in different colours. Such a colour selection with the use of RGB light emitting diodes may also be desirable in order to illuminate the hatracks or the corresponding handrail recesses, depending on the airline, in its specific colours.

Since as a rule the carrier module is fitted in a concave handrail recess, it may be advantageous to produce the carrier module from a flexible rollable material so that on the one hand the carrier module may be kept in stock as piece goods, and on the other hand, thanks to its flexible characteristics, may easily be fitted to the convex curved contour of the handrail recess and may assume the shape of said handrail recess.

As already mentioned, thanks to its positive-locking means the carrier module may be fitted in the handrail in a positive-locking manner so as to be exchangeable. To this effect the positive-locking means may have an outside contour that is designed to engage a corresponding counter-contour in a recess in the handrail. In this arrangement the external contour of the positive-locking means may for example be arranged on a deformable component section of the carrier module, which in a process of fitting it to the handrail first elastically gives way and then is fitted into the recess in the handrail. In this arrangement, the positive-locking means may in particular be shaped as a barb-like element, which prevents the carrier module, once fitted into the recess of a handrail, from falling out again without external mechanical action.

In order to generate as even a light distribution as possible of the individual illumination means of the multitude of illumination means, the invention provides for at least one diffuser lens to be arranged such that the light generated by the illumination means is scattered. With the use of a diffuser lens, for example when light emitting diodes are used as illumination means, even illumination of the handrail recess is achieved rather than generating individual illumination points. Furthermore, the use of a diffuser lens has an additional positive effect in that it also has heat-insulating properties so that the little heat generated by the light diodes may be further shielded, which is why the handrail may be touched by passengers largely without them perceiving any heat.

The hatrack according to an exemplary embodiment of the present invention may be particularly suitable for installation in an aircraft cabin, but with corresponding design changes it may of course also be installed in some other large-capacity means of transport such as, for example, a bus, train or ship. In the region of its lower border the hatrack according to the invention forms a concave handrail recess in the form of an underside at the transition to its side margin, which concave handrail recess in a single piece with the hatrack as such forms a handrail. Furthermore, the hatrack comprises an illumination strip as explained above. The illumination strip of the hatrack may thus comprise some or all the characteristics of the above-described illumination strip. So that the illumination strip may be built into the handrail that is formed by the handrail recess, along its length on its concave inside the handrail comprises a recess that is designed to accommodate the illumination strip in a positive-locking manner. In this arrangement the illumination strip may be fitted into the handrail in such a way that the concave handrail recess may be illuminated, at least in sections, by the illumination strip.

The design according to the invention of the hatrack may be useful in that, with it, it may not only be possible to ensure even backlighting of the handrail but also to make seat designators arranged in the handrail recess easily visible due to the illumination provided by the illumination strip, even if the light conditions in the passenger cabin are poor. Because the design of the hatrack may make it possible to illuminate the handrail recess in sections, furthermore in this way, by targeted illumination of certain sections of the hatrack, special regions in the cabin space, for example different aircraft classes, may be marked.

While such section-by-section illumination may be achieved with a special illumination control system for the illumination strip, along the handrail in sections it may also be possible to accommodate a multitude of separate illumination strips for generating light of different wavelengths, so that there is no need to incur the expense of a special control system.

In a practical embodiment, the above-mentioned colour-coding of various passenger classes may for example be achieved in that the hatrack according to the invention extends at least in part along a first passenger class and at least one second passenger class, wherein a first illumination strip in the first passenger class is made to generate light of a first colour, and a second illumination strip in the second passenger class is made to generate light of a second colour. Generating different colours of light in the different passenger classes may be achieved in that the first illumination strip is an LED strip of a first colour (for example red) while the second illumination strip is an LED strip of a second colour (for example green) so that the separation into classes becomes recognisable. As an alternative, the first illumination strip and the second illumination strip may also be RGB light emitting diode strips, which may be controlled separately with the use of a special illumination control system, so as to illuminate the respective classes, at will, in a desired colour. In other words, the individual illumination strips of the multitude of illumination strips may be connected to an illumination control system that is designed to cause each individual illumination strip to generate light of a different wavelength.

An illumination strip as described above, or a hatrack as described above, may also be used, in an aircraft, for illuminating seat designators that are arranged in the concave handrail recess.

BRIEF DESCRIPTION OF THE DRAWINGS

Below, the present invention is described in more detail with reference to the attached drawings that show only exemplary embodiments of the invention. The following are shown.

Identical or similar components in different figures have the same or corresponding reference characters.

DESCRIPTION OF EXEMPLARY
EMBODIMENTS OF THE INVENTION

Figure 1:
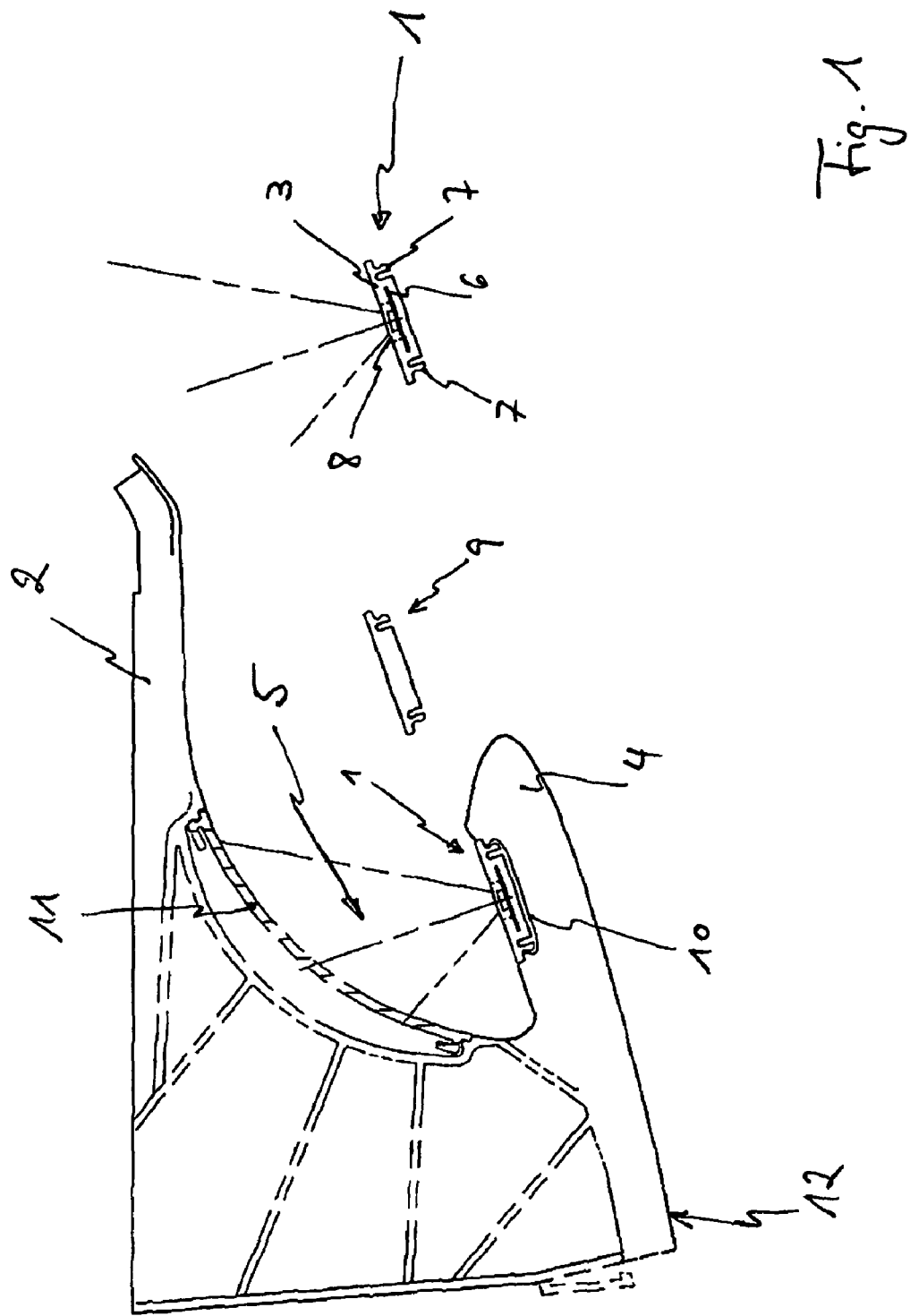
FIG. 1 shows a cross section of part of a hatrack according to the invention, as well as a cross section of the illumination strip according to the invention.

With reference to FIG. 1 the hatrack according to an exemplary embodiment of the present invention as well as the illumination strip is explained in detail. The right-hand diagram in FIG. 1 shows a cross section of an illumination strip 1 that has been removed from a handrail 4 or that has not yet been installed. The illumination strip 1 essentially comprises a strip-shaped carrier module 3 as well as a multitude of illumination means 6 fitted therein. The carrier module 3 may for example comprise a soft, flexible rollable material so that the carrier module 3 may be installed as piece goods in the handrail 4. The illumination means 6 may also be present as piece goods; it comprises a multitude of light emitting diodes that are tightly arranged on a strip, which light emitting diodes may preferably be RGB light emitting diodes. As indicated by the diagrammatic light rays, the light emitting diodes radiate light in one direction so that local illumination may be achieved at a desired position. To prevent the point-shaped illumination character of the individual light emitting diodes from presenting itself, in other words to achieve continuous illumination, in the direction of radiation of the light emitting diodes a lens 8, such as for example a diffuser lens 8, may be inserted in the carrier module 3 so that the light generated by the illumination means 6 is softly diffused.

The carrier module 3 has a flat, rollable shape and on its side facing away from the path of the rays comprises positive-locking means 7 by means of which the carrier module 3 may be fitted into a corresponding recess 10 in a handrail 4 so as to provide a positive-locking fit and so as to be exchangeable. The positive-locking means 7 may for example have a particular external contour that fits with a corresponding counter-contour in a recess 10 in a handrail 4 so that the carrier module 3 may be fitted into it in a positive-locking manner. In particular, the positive-locking means 7 may comprise a barb shape to prevent the carrier module 3 from falling out of the handrail 4 without there being some external mechanical influence.

Apart from the illumination strip 1 according to the invention, FIG. 1, at the centre, shows a dummy strip 9 whose external contour essentially corresponds to the external contour of the illumination strip 1. The dummy strip 9 may therefore be used to be fitted into a handrail 4 in positions where illumination by means of the illumination strip is not desirable.

The left-hand diagram in FIG. 1 explains the installation of an illumination strip 1 in a handrail 4, as well as its constructive incorporation in the hatrack 2 according to the invention. The diagram shows a cross section of a part of a hatrack 2 in the region of the transition between an underside 12 that delimits the hatrack towards the bottom, and a side surface or front surface which normally points in the direction of a passenger. In this transitional region there is a handrail recess 5 in the hatrack, which handrail recess 5, as shown in the diagram, may be concave in shape, for example C-shaped. The lower part of this C-shape forms a continuous handrail 4 that extends along several rib sections, into which handrail 4 an illumination strip 1 according to the invention may be fitted. To this effect, on its side facing the concave hollow space, the handrail 4 comprises a recess 10 which comprises an interior contour that corresponds to the contour of the illumination strip 1 and in particular to its positive-locking means 7. The depth of the recess 10 matches the component height of the illumination strip 1 so that the latter may be fitted flush into the recess 10. Opposite the lower part of the C-shape a seat designator 11 has been fitted (for example clipped) into the hand rail recess 5, which seat designator 11 forms an upper part of the C-shape of the handrail recess 5. In this arrangement the seat designator 11 is arranged opposite the illumination strip 1 in such a way that its light rays provide good illumination of the seat designator 11.

Figure 2:
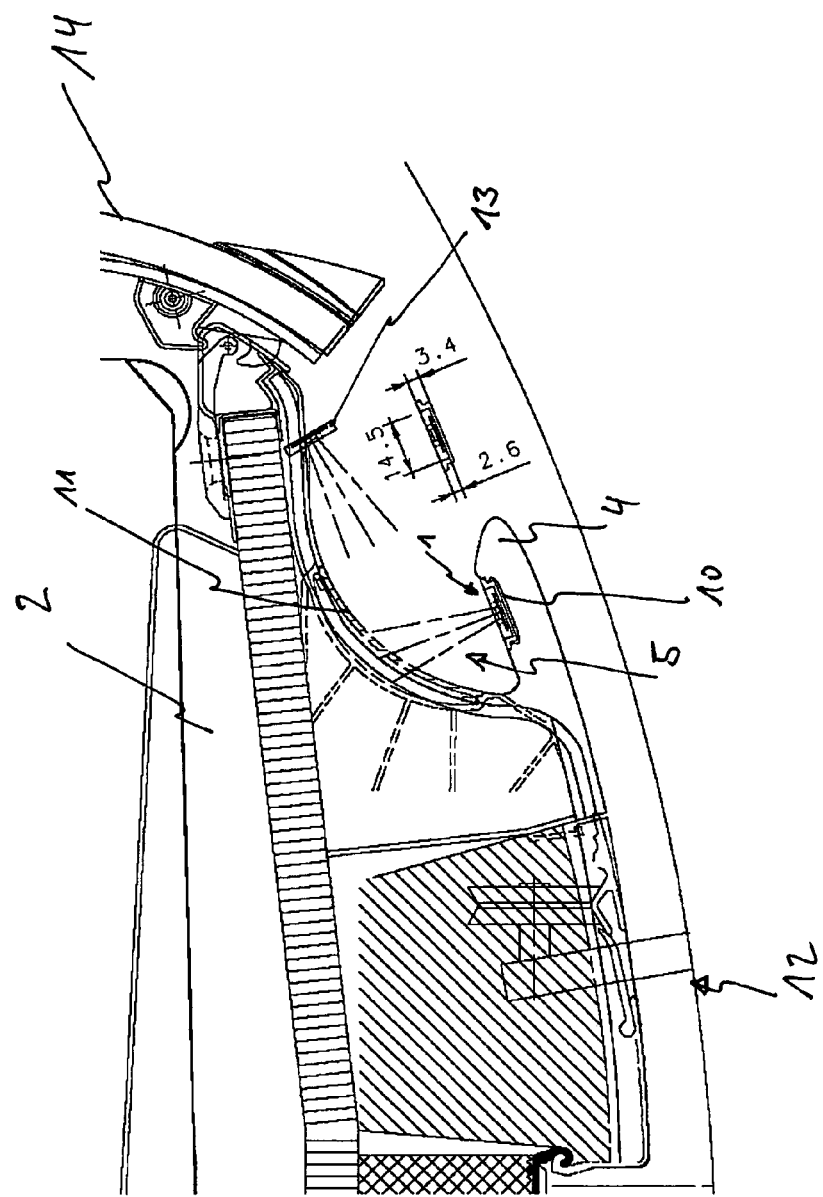
FIG. 2 shows a cross section of part of a concrete implementation of a hatrack according to the invention, as well as a cross section of an illumination strip.

FIG. 2 explains the concrete installation situation of an illumination strip in a hatrack 2. As shown, the installation of the illumination strip according to the invention takes place in the transition region between an underside 12 that delimits the hatrack towards the bottom, and a front surface 14 which as a rule may be opened towards a passenger aisle. In this transition region the hatrack comprises a handrail recess 5, which is concave in shape and together with the entire hatrack forms a single-piece handrail 4 as a result of the C-shape of the handrail recess 5. In the lower part of the handrail recess 5 that forms the handrail 4, an illumination strip 1 as described above is fitted. With it the entire handrail recess 5 and in particular a seat designator 11 may be illuminated, as a result of which the handrail 4 may become clearly recognisable and also the seat designators 11 may become more easily identifiable. In order to achieve even better illumination of the handrail recess 5 it may be possible to arrange a further additional illumination strip 13 such that it further improves illumination. As is also shown in FIG. 2 the illumination strip 1 has a very low component height of less than 4 mm, and furthermore is also relatively compact with less than 15 mm so that said illumination strip may easily be fitted into a handrail 4.

The C-shaped single-piece design of the handrail 4 with the hatrack 2 may make it possible to lead the handrail 4 continuously along several rib sections or along the entire passenger cabin. This may in particular be advantageous in an emergency situation when dense smoke is generated, because in such a situation flight passengers heading for the emergency exits may be continuously guided along by the handrail 4, without having to let go of said handrail 4 and in this way risking not being able to find it again.

Figure 3:
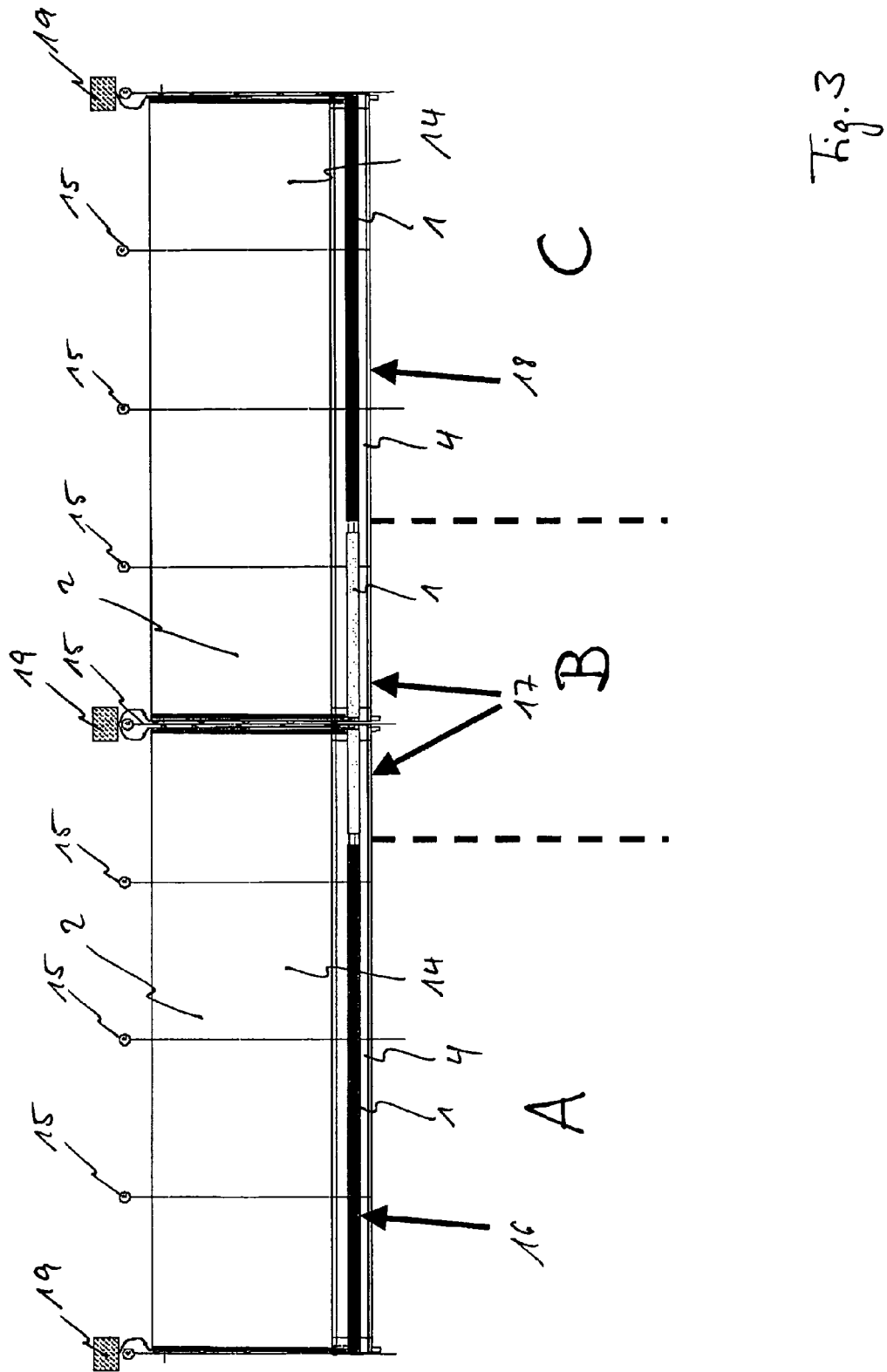
FIG. 3 shows a diagrammatic front view of a hatrack that extends along several rib fields.

FIG. 3 shows a diagrammatic front view of a hatrack 2 that extends continuously along several rib sections. In this arrangement, for the sake of clarity, the individual ribs 15 are shown diagrammatically only. The hatrack 2 is delimited towards the side or front by a multitude of front covers 14 towards the aisle. Underneath the front covers 14 the above described handrail recesses are situated, in whose handrail several illumination strips 1 are arranged that may also extend along several ribs. As indicated by the dashed lines, the section of an aircraft passenger cabin shown is divided into three different passenger classes 16, 17, 18 (classes A, B, C). In order to render these different classes visually recognisable, for example for the aircrew and the passengers, in the three classes A, B, C, illumination strips 1 of different colours have been fitted to the through-handrail 4, which illumination strips may be supplied with electrical power by means of separate power supply units 19. Instead of using LEDs of different colours for the respective illumination strips in the different classes it is, of course, also possible to use RGB light-emitting diodes so that the respective passenger classes may be marked using a corresponding control system for generating different illumination colours.

Figure 4:
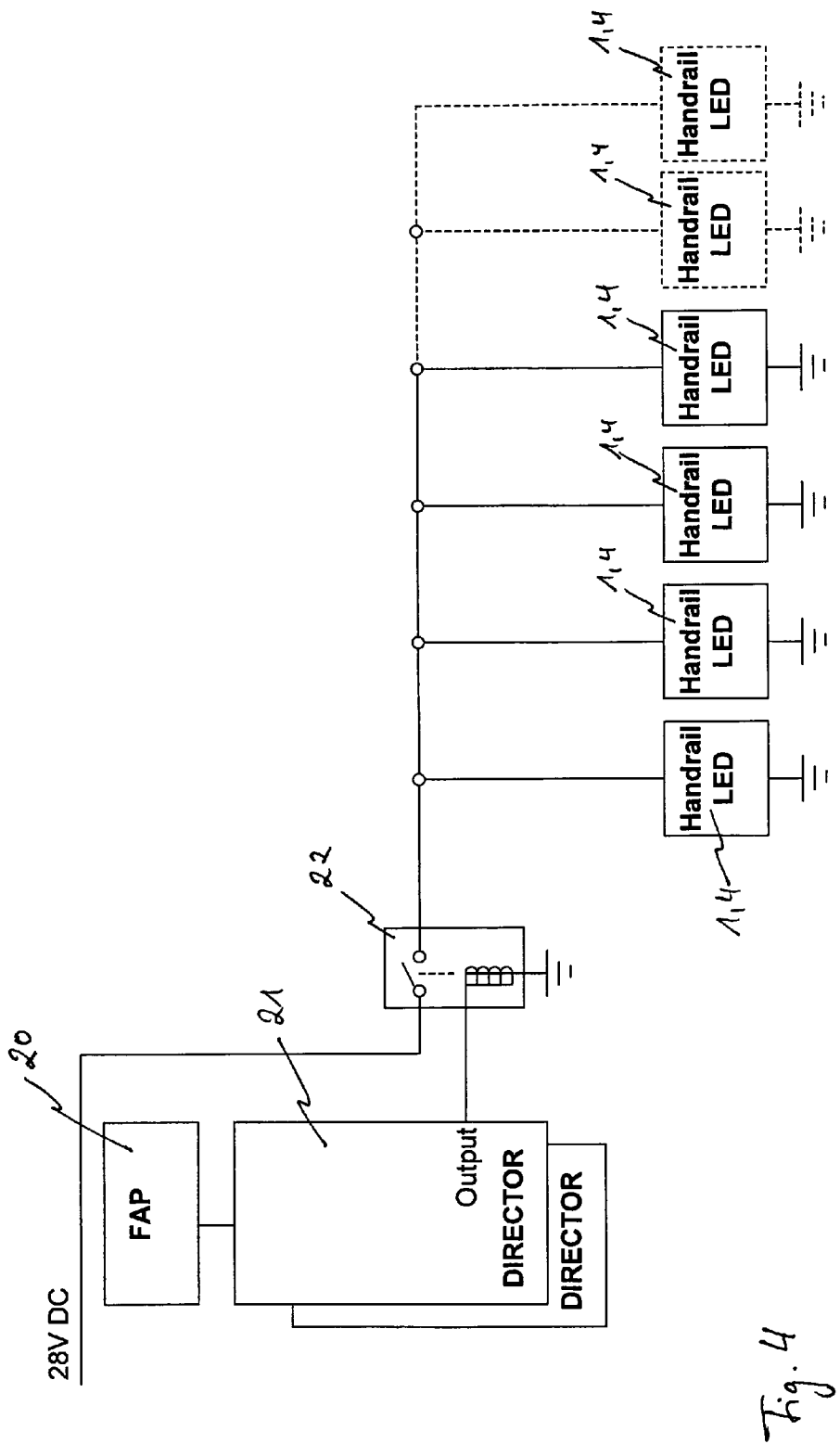
FIG. 4 shows a first control system for a multitude of illumination strips.
Figure 5:
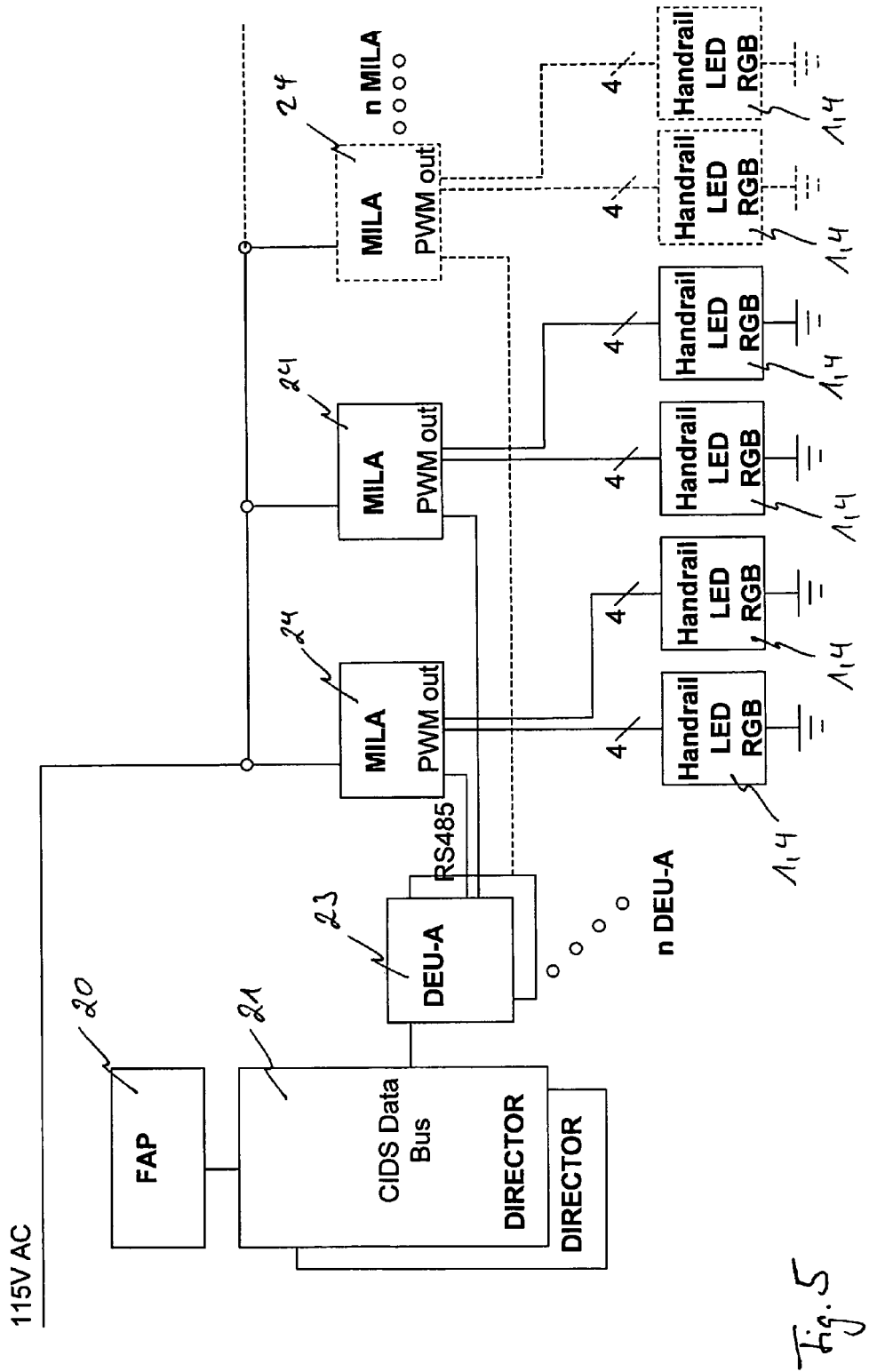
FIG. 5 shows a second control system for a multitude of illumination strips.

Finally, with reference to FIGS. 4 and 5 two different illumination control systems are explained. The control system described in FIG. 4 is used to switch on and off a multitude of different illumination strips 1. To this effect the individual illumination strips 1 for a 28-volt direct current source are fed with power. In order to switch the power supply unit on or off, a switch relay 22 is provided that may separate the illumination strips 1 from the direct current supply. Activation of the switch relay 22 takes place by way of an input device 20 whose control signals are transmitted to the switch relay 22 by way of a data bus 21 in order to activate the switch relay 22 in this way.

FIG. 5 describes a control system by means of which a multitude of separate strips of RGB LEDS for generating different illumination colours may be controlled separately. In this arrangement, power is supplied to the RGB-LED strips 1 by way of a 115-volt alternating current source which supplies power to the light control units 24. In this arrangement each light control unit 24 may control two separate illumination strips 1. Activation of the illumination strips 1 takes place by way of an input device 20 whose input signals are transmitted, by way of a data bus 21, to a decoder unit 23 made of several individual decoders, each of which controls one or several light control units 24. The decoders 23 decode the data bus signals 21 and transmit the light control signals to the light control unit 24 that is responsible for each individual illumination strip 1, wherein said light control units 24 convert these signals to colour information for activating a desired colour of an illumination strip 1 and transmit it to the illumination strip 1 to be activated. In this way a control system is provided that may make it possible to have a multitude of separate illumination strips 1 illuminated in different colours.

LIST OF REFERENCE CHARACTERS

1 Illumination strip
2 Hatrack
3 Carrier module
4 Handrail
5 Handrail recess
6 Illumination means (RGB-LED)
7 Positive-locking means
8 Lens
9 Dummy
10 Recess in the handrail
11 Seat designator
12 Underside of the hatrack
13 Additional illumination strip
14 Front surface of the hatrack
15 Rib
16 Passenger class A
17 Passenger class B
18 Passenger class C
19 Power supply
20 Input device
21 Data bus
22 Switch relay
23 Decoder/encoder
24 Light control unit

The invention claimed is:

1. A hatrack for an aircraft cabin including a plurality of ribs, a pair of adjacent ribs defining a rib section, rib sections arranged one after another along a length of the aircraft cabin, the hatrack comprising:
 a handrail having a surface shaped to define a concave handrail recess formed in the hatrack, the handrail and the hatrack formed of a single piece such that the handrail is configured to extend continuously along a plurality of rib sections;
 at least one illumination module;
 at least one positive-locking member configured to exchangeably secure the illumination module into the handrail;
 the handrail configured to accommodate the illumination module in a positive-locking manner so that the concave handrail recess is illuminated by the illumination strip at least in some sections of the handrail recess above the handrail.

2. The hatrack of claim 1, wherein the illumination module comprises a light emitting diode.

3. The hatrack of claim 1, wherein the illumination module comprises a RGB light emitting diode.

4. The hatrack of claim 1, wherein the illumination module comprises a carrier module comprising a plurality of illumination sources, and the carrier module is made of a flexible material.

5. The hatrack of claim 1, wherein the positive-locking member comprises an outside contour configured to engage a corresponding counter-contour in the concave handrail recess.

6. The hatrack of claim 5, wherein the positive-locking member is a barb.

7. The hatrack of claim 1, further comprising at least one diffuser lens positioned at the illumination module and configured to diffuse light generated by the illumination module.

8. The hatrack of claim 1, further comprising of illumination modules positioned along the handrail, the plurality of illumination modules comprising a second illumination module for generating light of a wavelength different from the wavelength of light of the illumination module and positioned remote from the illumination module.

9. The hatrack of claim 1,
 wherein the hatrack extends at least in part along a first passenger class and at least along a second passenger class of the aircraft cabin, and
 wherein the illumination module is positioned in the first passenger class and is configured to generate light of a first color; and
 further comprising a second illumination module positioned in the second passenger class and configured to generate light of a second color.

10. The hatrack of claim 1, further comprising a plurality of illumination modules, a first illumination module of the plurality of illumination connected to an illumination control system and configured to generate light of a different wavelength than a second illumination module of the plurality of illumination modules in accordance with controls provided by the illumination control system.

11. The hatrack of claim 1, wherein the illumination module is configured to illuminate a seat designator positioned in the concave handrail recess.

12. The hatrack of claim 1, wherein the illumination module comprises a strip-shaped carrier module comprising a plurality of illumination sources.

13. An aircraft cabin including a plurality of ribs positioned transverse to the length of the aircraft cabin, a pair of adjacent ribs of the plurality of ribs defining a rib section of the cabin, rib sections arranged sequentially along a lengthwise direction of the aircraft cabin, the aircraft cabin including the hatrack of claim 1.

14. A hatrack for an aircraft cabin, the hatrack comprising:
 a handrail having a top surface shaped to define a concave handrail recess formed in the hatrack, the handrail and the hatrack formed of a single piece;
 a plurality of illumination strips, each illumination strip comprising a strip shaped carrier module comprising a plurality of illumination sources positioned at the carrier module and configured to illuminate the handrail recess;
 a positive-locking member configured to secure the carrier module into the handrail;
 the handrail comprising a lighting recess configured to accommodate the illumination strip so that the concave handrail recess is illuminated by the illumination strip at least in some sections of the handrail recess above the handrail;

a second illumination strip of the plurality of illumination strips configured to generate light of a wavelength different from a first illumination strip of the plurality of illumination strips and positioned remote from the first illumination strip, wherein the hatrack extends at least in part along a first passenger class and at least along a second passenger class of the aircraft cabin, and wherein the first illumination strip is positioned in the first passenger class and is configured to generate light of a first color, and the second illumination strip positioned in the second passenger class and configured to generate light of a second color different from the first color.

15. A hatrack for an aircraft cabin, the hatrack comprising:

a handrail having a top surface shaped to define a concave handrail recess formed in the hatrack, the handrail and the hatrack formed of a single piece;

a plurality of illumination strips, each illumination strip comprising a strip shaped carrier module comprising a plurality of illumination sources positioned at the carrier module and configured to illuminate the handrail recess;

a positive-locking member configured to secure the carrier module into the handrail;

the handrail comprising a lighting recess configured to accommodate the illumination strip in a positive-locking manner so that the concave handrail recess is illuminated by the illumination strip at least in some sections of the handrail recess above the handrail;

a second illumination strip of the plurality of illumination strips configured to generate light of a wavelength different from a wavelength of light of a first illumination strip of the plurality of illumination strips and positioned remote from the first illumination strip.

16. In combination the hatrack for an aircraft cabin and a control system for controlling a plurality of illumination strips, the hatrack comprising:

a handrail having a top surface shaped to define a concave handrail recess formed in the hatrack, the handrail and the hatrack formed of a single piece;

a plurality of illumination strips, each strip comprising a strip shaped carrier module comprising a plurality of illumination sources positioned at the carrier module and configured to illuminate the handrail recess, a positive-locking member configured to secure the carrier module into the handrail, the handrail comprising a lighting recess configured to accommodate the illumination strip in a positive-locking manner so that the concave handrail recess is illuminated by the illumination strip at least in some sections of the handrail recess above the handrail;

the illumination control system configured to control a first illumination strip of the plurality of illumination strips to emit light of a wavelength different from the wavelength of light of a second illumination strip of the plurality of illumination strips.

17. A hatrack in an aircraft cabin including a plurality of ribs, a pair of adjacent ribs defining a rib section, rib sections arranged one after another along a length of the aircraft cabin, the hatrack comprising:

a handrail having a surface shaped to define a concave handrail recess formed in the hatrack, the handrail and the hatrack formed of a single piece such that the handrail is configured to extend continuously along a plurality of rib sections;

a lighting module positioned in the handrail and configured to illuminate at least a portion of the concave handrail recess above the lighting module.

18. The hatrack of claim 17, wherein the handrail comprises a lighting recess configured to receive the lighting module, and the lighting module comprises a member configured to removably secure the lighting module into the lighting recess.

* * * * *